(12) United States Patent
Egner-Walter

(10) Patent No.: US 6,802,101 B2
(45) Date of Patent: Oct. 12, 2004

(54) WINDSCREEN WIPING DEVICE INCLUDING LOAD ALLEVIATION

(75) Inventor: Bruno Egner-Walter, Heilbronn (DE)

(73) Assignee: Valeo Wischersysteme GmbH (DE)

( * ) Notice: Subject to any disclaimer, the term of this patent is extended or adjusted under 35 U.S.C. 154(b) by 0 days.

(21) Appl. No.: 10/362,005

(22) PCT Filed: Aug. 9, 2001

(86) PCT No.: PCT/EP01/09199

§ 371 (c)(1),
(2), (4) Date: Feb. 17, 2003

(87) PCT Pub. No.: WO02/14124

PCT Pub. Date: Feb. 21, 2002

(65) Prior Publication Data

US 2003/0177600 A1 Sep. 25, 2003

(30) Foreign Application Priority Data

Aug. 17, 2000 (DE) .......................................... 100 40 128

(51) Int. Cl.$^7$ ................................................ B60S 1/04
(52) U.S. Cl. .............................. 15/250.19; 15/250.001; 15/250.16; 15/250.201
(58) Field of Search ........................ 15/250.19, 250.001, 15/250.16, 250.43, 250.361, 250.44, 250.201

(56) References Cited

U.S. PATENT DOCUMENTS

| | | | | |
|---|---|---|---|---|
| 2,284,844 A | * | 6/1942 | Rappl ....................... 15/250.19 |
| 3,372,423 A | * | 3/1968 | Anderson ................. 15/250.43 |
| 4,040,141 A | * | 8/1977 | O'Steen .................... 15/250.19 |
| 4,063,328 A | * | 12/1977 | Arman ...................... 15/250.43 |
| 4,765,019 A | * | 8/1988 | Ochino ..................... 15/250.19 |
| 4,969,228 A | | 11/1990 | Edwards ................... 15/250.19 |
| 5,101,531 A | * | 4/1992 | Edwards et al. .......... 15/250.19 |
| 5,311,636 A | * | 5/1994 | Lee .......................... 15/250.201 |

FOREIGN PATENT DOCUMENTS

| | | | |
|---|---|---|---|
| DE | 1 505 397 | 5/1965 | |
| DE | 30 34 051 | 9/1980 | |
| DE | 197 34 843 | 2/1999 | |
| EP | 0 253 696 | 1/1988 | |
| JP | 0060354 | * 3/1986 | .............. 15/250.19 |

* cited by examiner

Primary Examiner—Gary K Graham
(74) Attorney, Agent, or Firm—J. Gordon Lewis

(57) ABSTRACT

A windscreen wiping device which includes a wiper arm which can be activated and a wiper blade which includes a wiper rubber having a carrier element receiver and a carrier element. A wiper lip is arranged on the wiper rubber and lies against the window to be wiped. Load alleviation elements which alleviate the wiper lip when the windscreen wiping device is in the parking position lift the wiper lip off the window to be wiped. The load alleviation elements include at least two interspaced pins arranged on the carrier element and ramps which co-operate with the pins and which are provided on the window or in the region around the window. In the parking position, the pins drive against the ramps in order to alleviate the wiper lip.

24 Claims, 3 Drawing Sheets

WINDSCREEN WIPING DEVICE INCLUDING LOAD ALLEVIATION

BACKGROUND

The invention relates to a windshield wiping device, specifically for windows of automobiles, with a driveable wiper arm, with a wiper blade located on the wiper arm and configured as a flat blade, where the wiper blade comprises a wiper rubber with a receiver for the support element and a support element located in the receiver configured as a pressure-distributing flexible spline, with a wiper lip positioned on the wiper rubber abutting the glass to be wiped.

In a wiping device of this type, known for example from DE 197 34 843A1, the support element, for example in the form of one or two ribbon-like elongate flexible splines, ensures optimal distribution of the contact pressure exerted by the wiper arm against the glass to be wiped. To achieve this, the support element is correspondingly pre-curved in the unloaded state, when the wiper blade is not abutting the glass, and manifests a curvature. The support element of a wiper device of this type thus replaces the complicated yoke construction with several yokes and claws, such as is known from DE 1 505 357 A1 for example.

In known wiping devices which have an aforementioned yoke construction, load-alleviating means are known which relieve the load on the wiper lip in a parked position and preferably lift the wiper lip away from the glass to be wiped (DE 30 34 051 C3). With this type of wiping device, the load-alleviating means include a cam located on the wiper arm which rides up on a ramp on the glass or in the region around the glass. This achieves alleviation of the load and advantageously lifts the wiper lip from the glass to be wiped Such load-alleviating means are, however, not suitable for wiper devices of the type described initially, which have a pre-curved support element. Lifting the wiper lip from the glass to be wiped is not possible in a straightforward manner as a consequence of the pre-curving of the support element. To make it possible to lift the wiper lip in accordance with the prior art, a height difference of about 100 mm would have to be overcome when the lip rides up on the ramp.

The object of the present invention is therefore to prepare a wiper device without a yoke and claw construction, in which load-alleviating means are provided which relieve the load on the wiper lip when the wiper device is in a parked position and preferably lift the lip from the glass to be wiped.

SUMMARY

This object is achieved in the case of a wiper device of the type described above in accordance with the invention, in which the load-alleviating means comprise two cams spaced at a distance to each other on the support element configured as a flexible spline and ramps located on the glass or in the region of the glass coacting with the cams, where the cams, when in the parked position, ride up on the ramps to relieve the load on the wiper lip.

The particular advantage of a wiper device of this type is that as a result of the cams riding up on the ramps to lift the wiper lip from the glass to be wiped, a height difference of only a few millimeters has to be overcome when the cams provided are spaced at a suitable distance. The number of cams to be employed is dependent on the pre-curvature of the at least one support element as well as on the length of the wiper blade in the longitudinal direction. Advantageously as a result more than two cams, for example, three, four or five cams can be used in accordance with the invention. The position of the cams is selected in accordance with the invention such that the result is an equal relief of the load along the entire length of the wiper rubber.

The cams and the ramps can advantageously be of a plastic material. When the wiper arm is articulated centrally on the wiper arm, and with a dissymmetrical pre-curvature of the support element around the center of the wiper blade, the cams are advantageously disposed symmetrically on the right and left adjacent the center of the wiper blade. The cams are advantageously located on side of the wiper blade facing the ramps. In addition, if only two cams and two ramps are employed, it is recommended to place them in each case at about one quarter of the extended length of the support element in accordance with a further improvement to the invention.

In a particularly advantageous aspect of the invention, the ramps comprise an ascending section running at an angle to the surface of the glass and a parking section preferably running largely parallel to the surface of the glass. When the cams rest on the parking section, the cams and thus the wiper blade do not back slide along the ascending section onto the glass to be wiped. To prevent any undesirable movement of the cams from the parking section, indents or depressions can be furnished in the parking sections in which the cams are held in the parked position.

Advantageous provision can be made under the invention for the support element to have recesses to position and retain the cams against the support element. It is conceivable, for example, that the cams are of plastics material and can be snapped onto the support element by means of latching elements. On the other hand, it is also conceivable that the cams are molded or cast in one piece directly onto the recesses in the support element.

In another particularly preferred aspect of the invention, the area of the wiper rubber away from the glass surface has a spoiler-like rise. The contact pressure of the wiper blade against the glass surface to be wiped is increased particularly at high vehicle speeds.

In accordance with the invention, the cams each include a securing section surrounding the area of the wiper blade facing away from the glass. A securing section of this type has the advantage that the cams can be attached extremely solidly to the wiper blade providing operating reliability.

In a particularly preferred aspect of the invention, the wiper rubber includes two longitudinal grooves arranged opposite each other extending in the longitudinal direction as receivers for the support element and a support element in the form of two ribbon-like, elongate flexible splines positioned in the longitudinal grooves. A wiper blade of this type has proven to be particularly advantageous, particularly in practice. Advantageous provision can be made here for the securing section to surround and/or engage the longitudinal sides of the flexible splines facing away from each other from beneath. This ensures a reliable attachment of the cams to a wiper device which has two flexible splines. Additionally, the sections engaging the flexible splines from beneath can be retained to the flexible splines through a snap fit.

An improvement to the invention, under which the cams and the ramps are furnished with mutually repelling magnets or are configured as mutually repelling magnets, has the advantage that the cams can slide contact-free or virtually contact-free onto the ramps, which avoids unwanted noise.

BRIEF DESCRIPTION OF THE DRAWING

Additional advantageous aspects and details of the invention will become apparent from the following description, in which the invention is described and explained in more detail with reference to the aspects shown in the drawing. In the drawing.

DETAILED DESCRIPTION

Figure 1:
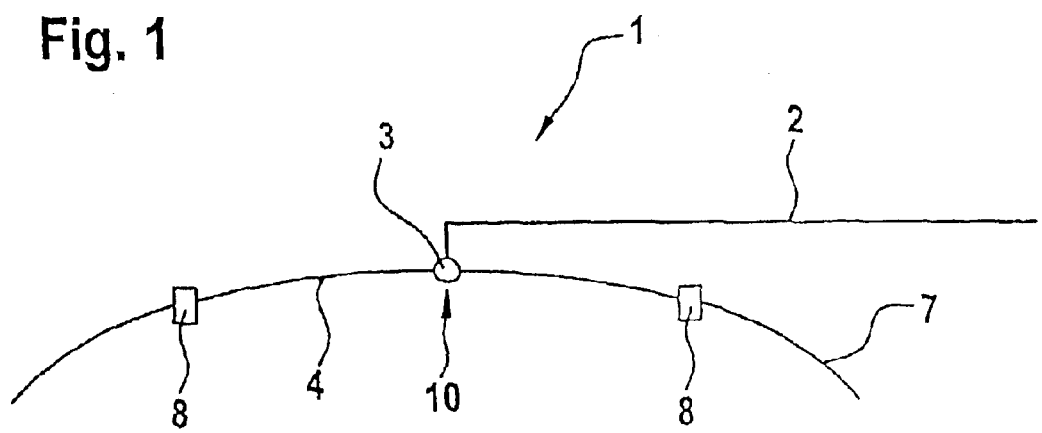
FIG. 1 is a schematic view of wiper device in accordance with the invention in the unbiased state.

The wiper device 1 shown in FIG. 1 to wipe a window glass not shown, specifically of a motor vehicle, has a driveable wiper arm 2 and a wiper blade 4 disposed on the wiper arm 2 by means of an adapter element 3. The wiper blade 4 comprises, as is evident from FIGS. 3, 4 and 5, a wiper rubber 5 with two receivers in the form of two longitudinal grooves 6 positioned opposite each other and extending in the longitudinal direction. Two support elements in the form of two elongate flexible splines 7 are positioned in the longitudinal grooves 6. As can be seen clearly from FIG. 1, the flexible splines 7 have an initial curvature in the unbiased state, when the wiper blade 4 is not abutting the glass to be wiped. Because of this initial curvature, when the wiper blade 4 is pressed down, a desired, consistent wiper blade pressure against the glass to be wiped is achieved.

Figure 2:
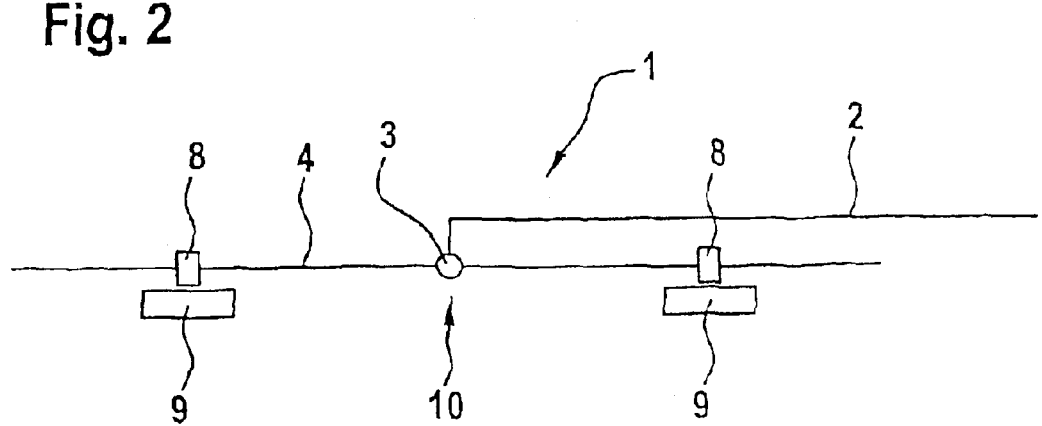
FIG. 2 is a schematic view of a wiper device from FIG. 1 in the parked position.

The wiper device 1 shown in FIGS. 1 and 2 also includes two cams 8 located at a distance to each on the flexible splines 7 and ramps 9 which interact with the cams 8 and are preferably located on the glass or in the region around the glass to be wiped.

Figure 3:
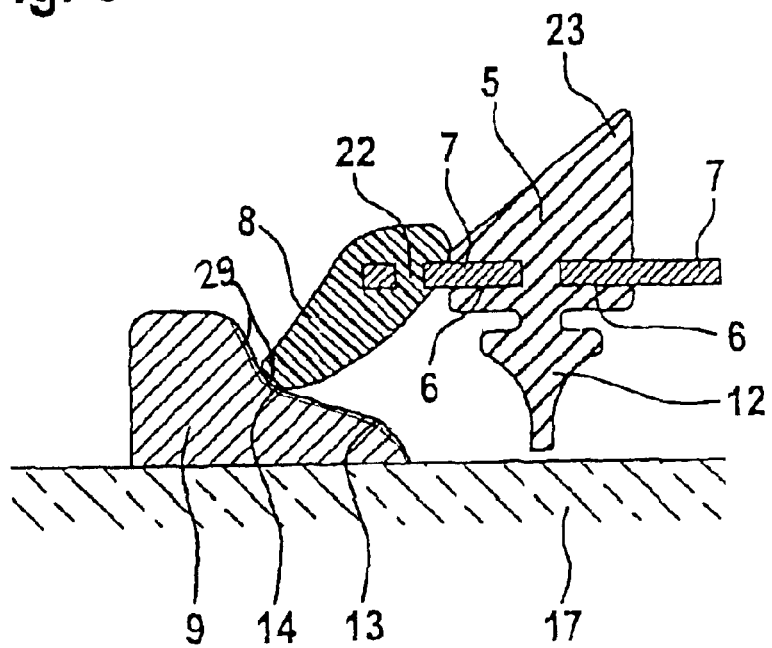
FIG. 3 is a cross section through an inventive wiper device.
Figure 4:
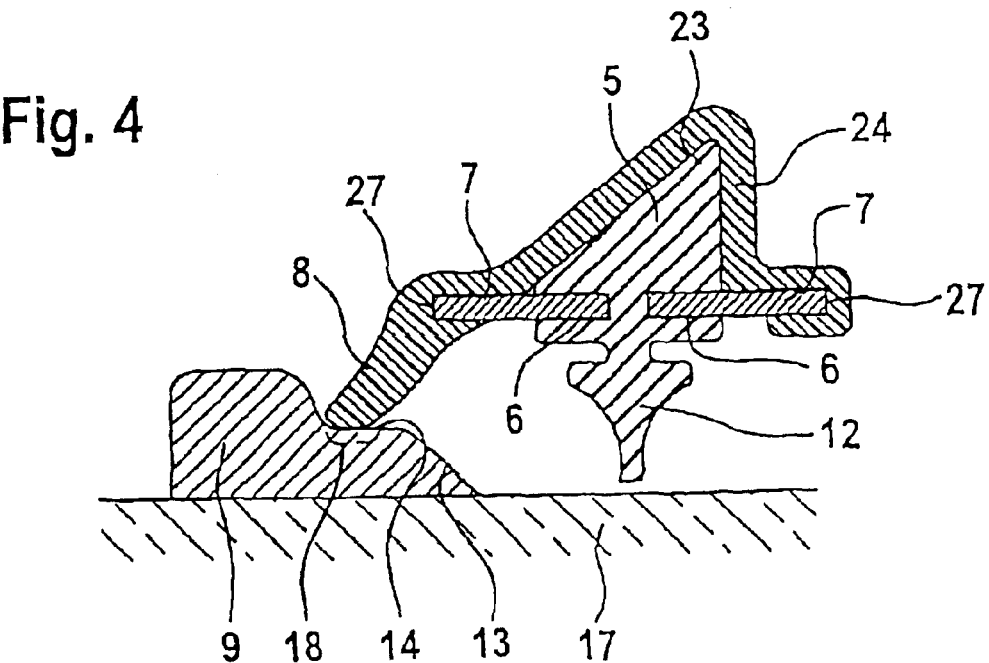
FIG. 4 is a cross section through another aspect of an inventive wiper device.
Figure 5:
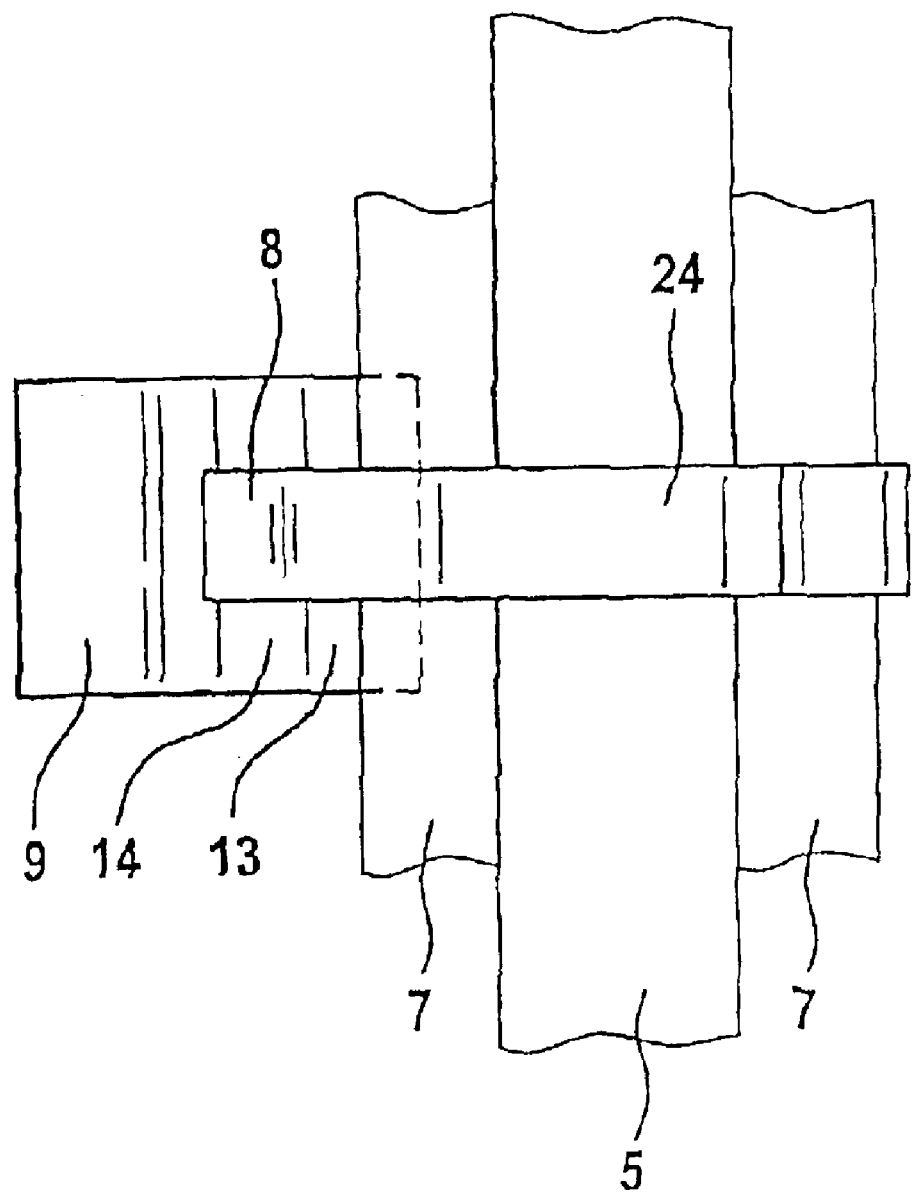
FIG. 5 is a top view of the wiper device shown in FIG. 4.

In FIG. 2, the wiper device 1 is shown in the parked position. The cams 8 have ridden up onto the ramps 9, whereby the load on the wiper rubber 5 is relieved, or rather the load on the wiper lip 12 forming part of the wiper rubber 5 and shown in FIGS. 3–5 is relieved. With a suitable arrangement of the cams 8 on the wiper blade 4, even using just two cams 8 achieves a load reduction extending evenly over the entire wiper blade 4. If, as in the example of FIG. 2, the wiper blade 4 is articulated at its center 10 on the wiper arm 2, the cams 8 should be advantageously located in each case at one quarter of the extended length of the flexible spline 7.

However, provision can also be made that instead of two cams 8, additional cams are provided to achieve an optimal and extremely even reduction in load, where the wiper lip 12 in the parked position is advantageously lifted away from the glass to be wiped over the entire length of the wiper blade 4.

In FIGS. 3 and 4, the glass to wiped is identified with the reference numeral 17. The ramps 9 are located directly on the glass. The ramps 9 have a ascending section 13 and a parking section 14.

In contrast to the aspect from FIG. 3, the ramp 9 in FIG. 4 has a parking section 14 which runs largely parallel to the glass 17 to be wiped. As suggested in FIG. 4 with a broken line 18, provision can be made in a further aspect of the invention for the parking section 14 to have an indent or depression to secure the wiper blade 4 in the parked position.

Through the inventive arrangement of the cams 8 and the ramps 9, the height difference to be overcome over the ascending section is very small. The height of the wiper device 1 under the invention can be extremely low in the parked position, which advantageously results in a very flat wiper device 1.

In the aspect of the invention shown in FIG. 3, the cam 8, which is preferably of a plastic material, is molded to the flexible spline 7 facing toward the ramp 9. To create a permanent connection between the cam 8 and the flexible spline 7, the flexible spline 7 has a recess in the form of a punched hole 22 which is filled by the cam 8.

As can be clearly seen from FIG. 3 and also FIG. 4, the area of the wiper rubber 5 away from the glass to be wiped 17 has a spoiler-like rise 23. Because of the air flowing against the spoiler-like rise 23, downforce on the wiper blade is increased, particularly at higher vehicle speeds. Advantageously the surface of the cam 8 facing the oncoming stream of air can be configured to match the spoiler-like rise 23, thereby allowing an additional increase in the downforce on the wiper blade to be achieved.

In the aspect of the invention shown in FIG. 4, the cam 8 has an attaching section 24 which surrounds the spoiler-like rise 23. The attaching section 24 surrounds and engages the longitudinal side 27 of the flexible splines 7 away from each other from beneath. This ensures a permanent and operationally reliable disposition of the cam 8 on the wiper blade 4, or on the support element in the form of two flexible splines 7. By constructing the cam 8 in one piece with the attaching section 24, the surface of the cam 8 facing the oncoming airstream can be shaped in an aerodynamically positive way with the attaching section 24.

As is clearly evident from FIG. 3 and FIG. 4, the wiper lip is lifted off the glass to be wiped 17 in the parked position shown.

FIG. 5 shows the cam 8 disposed on the flexible splines 7 with attaching section 24 in a top view. It can be clearly seen that the ramp 9 shown is embodied somewhat wider than the cam 8, which ensures that the cam 8 rides up securely over the ascending section 13 onto the parking section 14.

An improvement to the invention, under which the cams 8 and the ramps 9 are furnished with mutually repelling magnets 29 or are configured as mutually repelling magnets has the advantage that the cams 8 can slide contact-free or virtually contact-free onto the ramps 9, which avoids unwanted noise.

All features presented in the description, the claims to follow and the drawing can be essential to the invention individually as well as in any combination with each other.

What is claimed is:

1. In a wiper device of the type for glass for a vehicle window, the wiper device having a driveable wiper arm, a wiper blade configured as a flat wiper blade disposed on the wiper arm, where the wiper blade includes a wiper rubber with a receiver for a support element and the support element located in the receiver configured in an unbiased state as a pressure-distributing flexible spline having a concave curvature in proportion to the glass to be wiped, with a wiper lip disposed on the wiper rubber abutting the glass to be wiped and with load-alleviating means which relieve the load on the wiper lip in a parked position of the wiper device and lift the wiper lip from the glass to be wiped, where the load-alleviating means include at least two ramps on one of the glass and in the area around the glass, the improvement comprising that the load-alleviating means further include at least two cams disposed on the flexible spline of the flat wiper blade at a distance from each other and which ride up on the ramps to relieve the load on the wiper lip.

2. The improvement to the wiper device from claim 1, wherein the cams in the longitudinal direction of the wiper blade are disposed at such distances from each other that in the unloaded parked position the wiper lip is relieved of load almost evenly over the extent of its entire length.

3. The improvement to the wiper device from claim 1, wherein with the wiper blade articulated centrally on the wiper arm wherein the flexible spline is generally dissymmetrical pre-curved around the center of the wiper arm, the cams are correspondingly symmetrical on both sides adjacent the center of the wiper blade.

4. The improvement to the wiper device from claim 3, wherein, when two ramps and cams are used, the ramps and cams are positioned in each case about one quarter of the extended length of the flexible spline.

5. The improvement to the wiper device from claim 1, wherein the ramps comprise an ascending section running at an angle to the surface of the glass and a parking section running substantially parallel to the surface of the glass.

6. The improvement to the wiper device from claim 5, wherein the parking section of the ramps have an indent.

7. The improvement to the wiper device from claim 1, wherein the support element has recesses to locate the cams.

8. The improvement to the wiper device from claim 1, wherein the area of the wiper rubber facing away from the glass has a spoiler-like rise.

9. The improvement to the wiper device from claim 1, wherein the cams include an attaching section enclosing an area of the wiper rubber facing away from the glass.

10. The improvement to the wiper device from claim 9, wherein the wiper rubber comprises as a receiver for the support element two oppositely situated longitudinal grooves extending in the longitudinal direction and a support element in the form of two ribbon-like, elongate flexible splines located in the longitudinal grooves.

11. The improvement to the wiper device from claim 10, wherein the attaching section encloses the longitudinal sides of the flexible splines facing away from each other from beneath.

12. The improvement to the wiper device from claim 1, wherein the cams and the ramps are one of furnished with mutually repelling magnets and configured as mutually repelling magnets.

13. A wiper device for a window of a vehicle, said device comprising:
a drivable wiper arm;
a wiper blade configured as a flat blade disposed on the wiper arm, said wiper blade including a wiper rubber with a receiver;
a support element located in the receiver, said support element configured in an unbiased state as a pressure distributing flexible spline having a concave curvature in proportion to the window to be wiped;
a wiper lip disposed on the wiper rubber abutting the window; and
load-alleviating means for relieving the load on the wiper lip in a parked position of the wiper device and for lifting the wiper lip from the window, wherein the load-alleviating means includes at least two ramps on one of the glass and in the area around the glass and at least two cams disposed on the flexible spline of the flat wiper blade at a distance from each other, and wherein said cams ride on the ramps to relieve the load on the wiper lip.

14. The wiper device of claim 13, wherein the cams in the longitudinal direction of the wiper blade are disposed at such distances from each other that in the unloaded parked position, the wiper lip is relieved of load almost evenly over the extent of its entire length.

15. The wiper device of claim 13, wherein with the wiper blade articulated centrally on the wiper arm wherein the flexible spline is generally dissymmetrical pre-curved around the center of the wiper arm, the cams are correspondingly symmetrical on both sides adjacent the center of the wiper blade.

16. The wiper device of claim 15, wherein, when two ramp and cams are used, the ramps and cams are positioned in each case about one quarter of the extended length of the flexible spline.

17. The wiper device of claim 13, wherein the ramps comprise an ascending section running at an angle to the surface of the window and a parking section running substantially parallel to the surface of the window.

18. The wiper device of claim 17, wherein the parking section of the ramps have an indent.

19. The wiper device of claim 13, wherein the support element has recesses to locate the cams.

20. The wiper device of claim 13, wherein the area of the wiper rubber facing away from the window has a spoiler-like rise.

21. The wiper device of claim 13, wherein the cams include an attaching section enclosing an area of the wiper rubber facing away from the window.

22. The wiper device of claim 21, wherein the wiper rubber comprises as a receiver for the support element two oppositely situated longitudinal grooves extending in the longitudinal direction and a support element in the form of two ribbon-like, elongate flexible splines located in the longitudinal grooves.

23. The wiper device of claim 22, wherein the attaching section encloses the longitudinal sides of the flexible splines facing away from each other from beneath.

24. The wiper device of claim 13, wherein the cams and the ramps are one of furnished with mutually repelling magnets and configured as mutually repelling magnets.

* * * * *